US006856107B2

(12) United States Patent
Daboussi

(10) Patent No.: US 6,856,107 B2
(45) Date of Patent: Feb. 15, 2005

(54) LINEAR-MOTION ENGINE CONTROLLER AND RELATED METHOD

(75) Inventor: Zaher Daboussi, Arcadia, CA (US)

(73) Assignee: AeroVironment Inc., Monrovia, CA (US)

(*) Notice: Subject to any disclaimer, the term of this patent is extended or adjusted under 35 U.S.C. 154(b) by 0 days.

(21) Appl. No.: 10/417,579

(22) Filed: Apr. 17, 2003

(65) Prior Publication Data

US 2004/0207347 A1 Oct. 21, 2004

(51) Int. Cl.[7] .............................................. H02K 41/00
(52) U.S. Cl. ..................................... 318/135; 123/46 E
(58) Field of Search .......................... 310/12–39; 318/22, 318/35, 38, 115, 119–134, 135; 290/40 R, 40 A–40 F; 322/3; 123/46 R, 46 E

(56) References Cited

U.S. PATENT DOCUMENTS

| 2,904,701 A | * | 9/1959 | Colgate ......................... 290/1 R |
| 4,291,258 A | * | 9/1981 | Clark et al. .................. 318/124 |
| 4,315,197 A | * | 2/1982 | Studer ......................... 318/135 |
| 4,345,437 A | | 8/1982 | Dineen ......................... 60/521 |
| 4,433,279 A | * | 2/1984 | Bhate ............................. 322/3 |
| 4,434,617 A | | 3/1984 | Walsh ........................... 60/520 |
| 4,454,426 A | * | 6/1984 | Benson ....................... 290/1 R |
| 4,532,431 A | * | 7/1985 | Iliev et al. ................... 290/4 R |
| 4,567,726 A | | 2/1986 | Vitale et al. ................. 60/520 |
| 4,642,547 A | * | 2/1987 | Redlich ........................... 322/3 |
| 4,649,283 A | * | 3/1987 | Berchowitz et al. ........ 290/1 R |
| 5,032,772 A | * | 7/1991 | Gully et al. ................. 318/135 |
| 5,751,069 A | * | 5/1998 | Rajashekara et al. ..... 290/40 C |
| 5,850,111 A | * | 12/1998 | Haaland ....................... 310/15 |

OTHER PUBLICATIONS

Pages printed from Internet website www.bekkoame.ne.jp/~khirata/english/howwork.htm on Oct. 9, 2001.
Pages printed from Internet website www.jenny.mes.titech.ac.jp/jshinozu/English/engine.html on Mar. 26, 2001.
Pages printed from Internet website www.ffden–2.phys.uaf.edu/212.we...&%20Eric%20Jense%20Folder/how.html on Mar. 26, 2001.

* cited by examiner

Primary Examiner—Dang Le
(74) Attorney, Agent, or Firm—Sheppard, Mullin, Richter & Hampton LLP

(57) ABSTRACT

An apparatus and method for controlling a range of movement of a power piston coupled to an alternator in a linear-motion engine. The apparatus includes a power bridge and a bridge controller. The power bridge is coupled to the alternator and is used to adjust a voltage output from the alternator. The bridge controller is coupled to the power bridge and the alternator and is used to compare the voltage output from the alternator to a reference voltage that corresponds to a desired range of movement of the power piston, and generate a plurality of control signals used to control the operation of the power bridge.

36 Claims, 4 Drawing Sheets

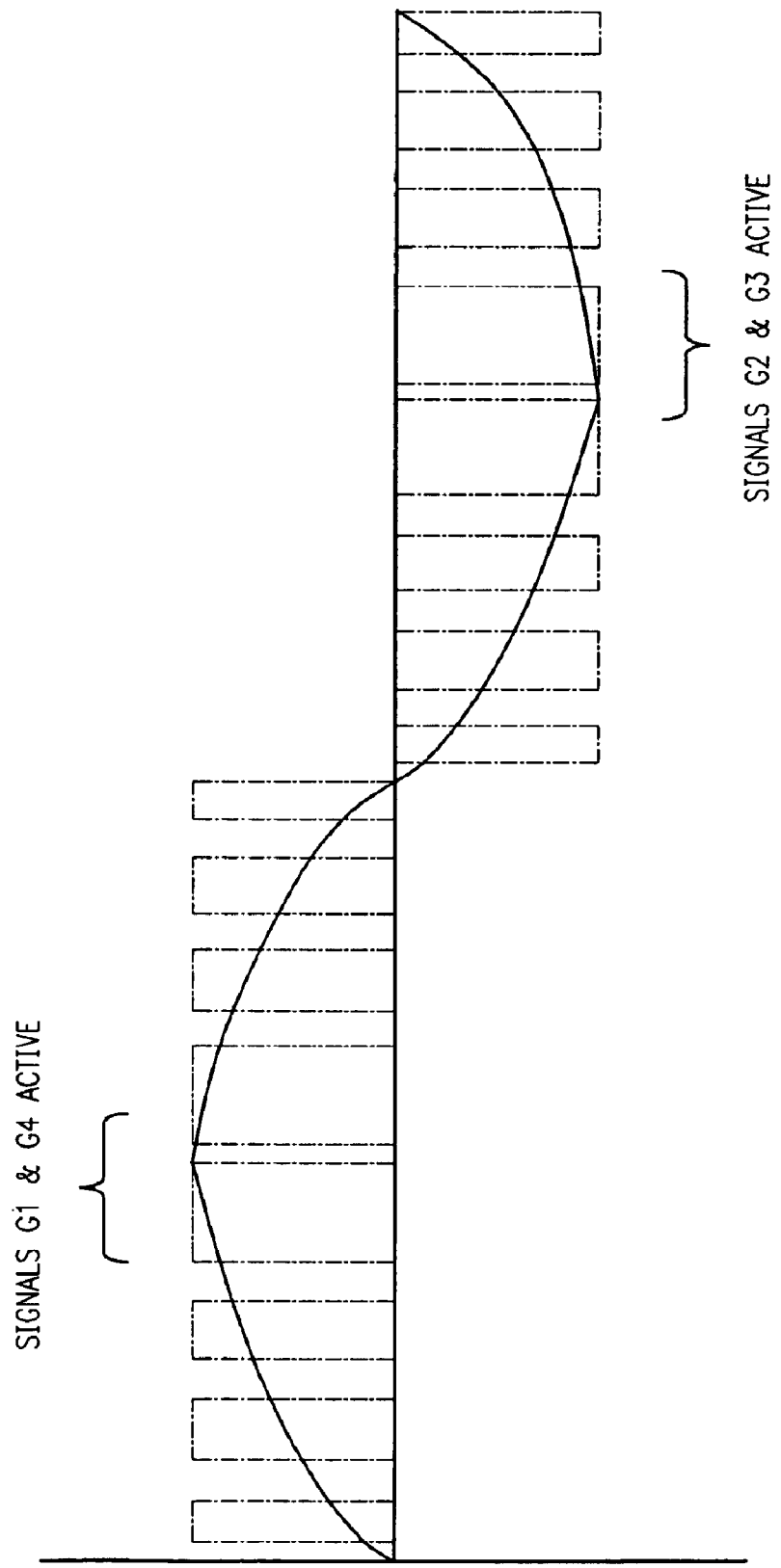

LINEAR-MOTION ENGINE CONTROLLER AND RELATED METHOD

FIELD OF THE INVENTION

The invention relates generally to the field of microcontrollers. More specifically, the invention relates to a microcontroller for controlling a linear-motion engine, such as a Stirling engine.

BACKGROUND OF THE INVENTION

A conventional linear-motion engine, such as a Stirling engine, includes a displacement piston coupled to a power piston. The displacement piston moves as a result of applied thermal energy, which, in turn, causes the power piston to move. Electrical power is generated due to the motion of the power piston. More specifically, the power piston is coupled to an alternator, which converts the power piston's motion into electrical power.

The alternator includes two main parts, a stationary part referred to as the stator and a moving part referred to as the armature. Typically, the stator is made from a slotted iron core with copper wire windings wound inside the slots. The armature usually includes a set of permanent magnets mounted on a rigid body, preferably formed from a non-magnetic material, such as aluminum that is coupled to the power piston.

The amplitude and polarity of magnetic flux created by the armature's permanent magnets changes when the power piston moves the armature. A voltage is produced across the stator's windings as a result of the change in magnetic flux. The voltage produced is referred to as the electromotive force, or emf, and it is defined as follows:

$$emf = N \times d\phi_{flux}/dt$$

where $\phi_{flux} = B_{mag} \times W \times Xp$, and
emf = electromotive force
N = the number of turns in the stator's windings
$d\phi_{flux}/dt$ = the rate of magnetic flux change
W = the width of the armature's permanent magnets
$B_{mag}$ = the magnetic field strength of the armature's permanent magnets
Xp = the power piston's position amplitude From the above expression, if $\phi_{flux}$ is a sinusoidal waveform the emf can be expressed as $$emf = B_{mag} \times W \times Xp \times F$$

where
F = the piston frequency

Thus, a direct relationship exists between the position amplitude of the power piston and the emf of the alternator. For a constant piston frequency, the greater the emf, the greater the range of movement of the power piston. The smaller the emf, the smaller the range of motion of the power piston. Because of this relationship, the power piston's position can be controlled by controlling the amplitude of the emf. This is particularly desired since Stirling engines are typically optimized to run at a constant piston frequency.

Under load, the voltage across the terminals of the alternator differs both in magnitude and phase from the emf. Primarily, the difference between the voltage across the terminals of the alternator and the emf is due to the impedance, i.e., inductance and resistance, of the stator windings. Typically, the inductive term is the dominant term of the stator winding impedance. In order to control the piston position amplitude, the emf must be directly accessible. Typically, a tuning capacitor is placed in series with the alternator in order to null out the effect of the inductance of the stator windings. Use of the tuning capacitor to facilitate access to the emf, allows for the use of a variety of loads with voltage limiting capability to limit the piston amplitude.

There are several disadvantages associated with coupling a tuning capacitor between the alternator and the load. First, the capacitance of the tuning capacitor may need to be adjusted due to changes in the impedance of the load over time. Otherwise, the efficiency of the linear-motion engine may be compromised. Second, tuning capacitors are costly since they are low tolerance components. Third, the tuning capacitors may require significant space, depending on the electrical characteristics of the load. Finally, a tuning capacitor does not compensate for the resistance of the stator windings, which contributes to an uncontrolled growth in amplitude, which may result in piston over-stroke.

Accordingly, there is a need for a low-cost apparatus used to control the movement of a power piston in a linear-motion engine so as to efficiently and effectively drive a load without requiring the use of a tuning capacitor. The present invention satisfies this need.

SUMMARY OF THE INVENTION

An exemplary system that embodies the invention is an apparatus for controlling a range of movement of a power piston coupled to an alternator in a linear-motion engine. The apparatus includes a power bridge and a bridge controller. The power bridge is coupled to the alternator and is used to adjust a voltage output from the alternator. The bridge controller is coupled to the power bridge and the alternator, and is used to compare the voltage output from the alternator to a reference voltage that corresponds to a desired range of movement of the power piston, and to generate a plurality of control signals used to control the operation of the power bridge. In other, more detailed features of the invention, the apparatus includes the linear-motion engine having the alternator coupled to the power piston.

In other, more detailed features of the invention, the power bridge includes a plurality of switches coupled to the bridge controller and each of the plurality of switches receives one of the plurality of control signals. Also, output power lines are coupled between the power bridge and a load, and at least one capacitor is coupled between the output power lines.

In other, more detailed features of the invention, the bridge controller includes a root-mean-square (rms) voltage calculator coupled to the alternator that calculates an rms voltage based on the voltage output from the alternator, and an rms current calculator that calculates an rms current based on a current output from the alternator. A current probe is coupled between the rms current calculator and the alternator. Also, in more detailed features of the invention, the bridge controller includes a proportional integral derivative (pid) regulator coupled to the rms voltage calculator. The pid regulator receives the rms voltage and a reference voltage, and generates a dc reference current as a function of a difference between the rms voltage and the reference voltage.

In other, more detailed features of the invention, the bridge controller further includes a multiplier coupled to the pid regulator and the alternator. The multiplier converts the dc reference current and the voltage output from the alternator into an ac reference current. Also, the bridge controller includes a phase advance coupled to the multiplier and the rms current calculator. The phase advance generates a third reference current that represents a phase-shifted version of the ac reference current. In addition, the bridge controller includes a current regulator coupled to the phase advance and the alternator. The current regulator determines a duty cycle based on a difference between the third reference current and the current output from the alternator. Furthermore, the bridge controller includes a pulse width modulator (pwm) generator coupled between the current regulator and the power bridge. The pwm generator generates the plurality of control signals used to control operation of the power bridge based on the duty cycle. The power bridge also includes a plurality of switches coupled to the pwm generator, and each of the plurality of switches receives one of the plurality of control signals.

An exemplary method that embodies the invention is a method for controlling a range of movement of a power piston coupled to an alternator in a linear-motion engine. The method includes measuring a voltage output from the alternator, and controlling the range of motion of the power piston by controlling the voltage output from the alternator.

In other, more detailed features of the invention, the method further includes measuring a current output from the alternator, generating a plurality of control signals based on the voltage and current output from the alternator, and controlling the voltage output from the alternator based on the plurality of control signals.

In other, more detailed features of the invention, the method further includes calculating an rms voltage from the voltage output from the alternator, generating a dc reference current based on the rms voltage and a reference voltage, measuring a current output from the alternator, and calculating an rms current from the current output from the alternator. Also, the method further includes generating an ac reference current based on the dc reference current and the rms current, generating a third reference current based on the ac reference current and the rms current, and generating a duty cycle based on the third reference current and the current output from the alternator. In addition, the method includes generating a plurality of control signals based on the duty cycle, and controlling the voltage output from the alternator based on the plurality of control signals.

Other features of the invention should become apparent from the following description of the preferred embodiments taken in conjunction with the accompanying drawings, which illustrate, by way of example, the principles of the invention.

BRIEF DESCRIPTION OF THE DRAWINGS

FIG. 4 is a graph illustrating the signal output from the engine controller depicted in FIGS. 1 and 2, as a function of control signals G1–G4.

DETAILED DESCRIPTION OF THE PREFERRED EMBODIMENTS

Figure 1:
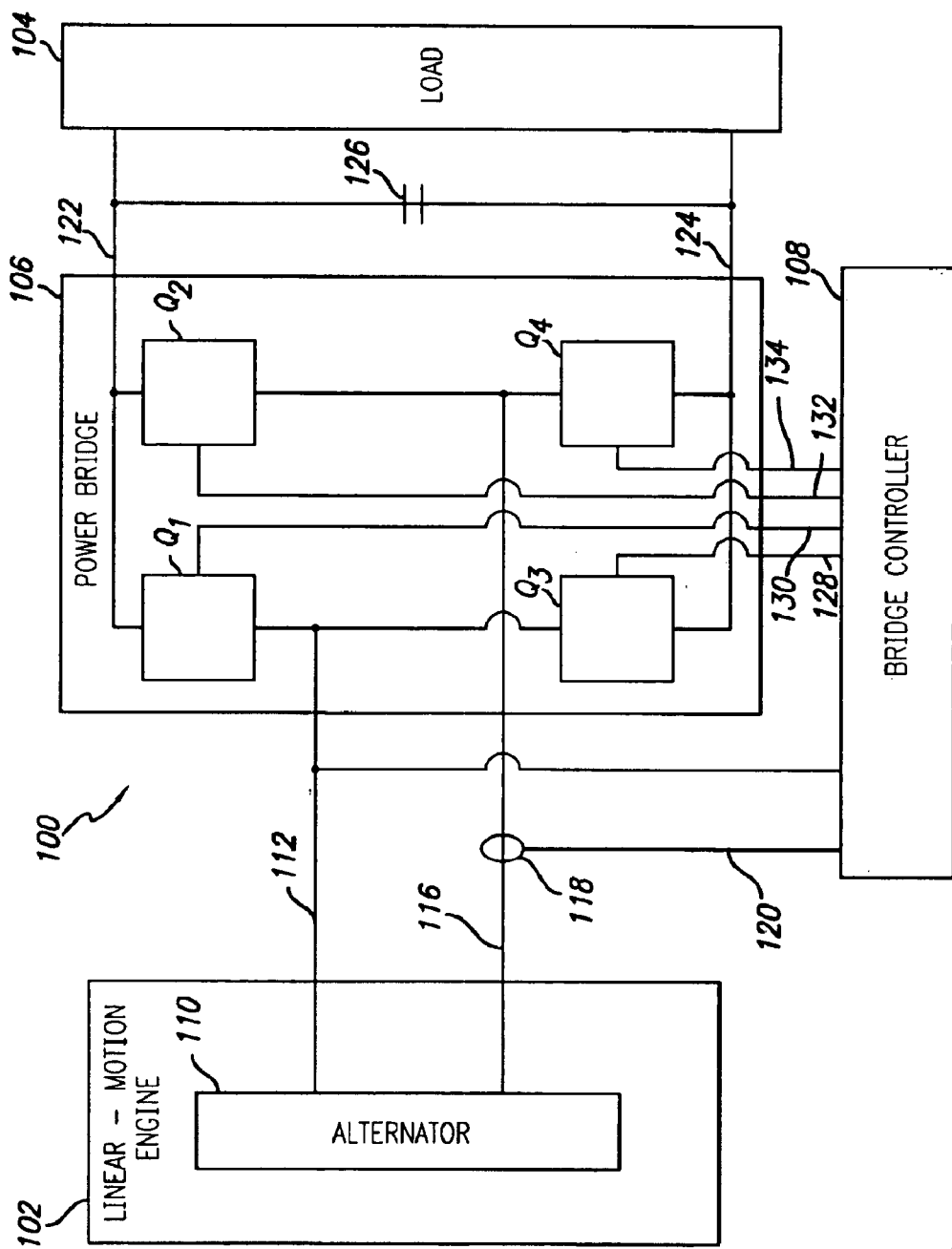
FIG. 1 is a block diagram illustrating a preferred embodiment of the engine controller of the present invention.

FIG. 1 illustrates a preferred embodiment of the engine controller 100 of the present invention. The engine controller is coupled between a linear-motion engine 102, e.g., a Stirling engine, and a load 104. The engine controller includes a power bridge 106 coupled between the linear-motion engine and the load, and it further includes a bridge controller 108 coupled between the linear-motion engine and the power bridge. The linear-motion engine includes an alternator 110 that generates ac electrical power in response to the movement of a power piston (not shown). In operation, the engine controller controls the range of motion of the power piston, and thus, controls the range of motion of a displacement piston (not shown) by controlling the alternator's output voltage, which depends on the value of emf generated by the alternator.

The alternator 110 supplies electrical power on a first input power line 112 to the power bridge 106. The electrical power supplied by the alternator has an instantaneous voltage $V_A(t)$ and an instantaneous current $I_A(t)$ at time t. Also, the alternator supplies $V_A(t)$ on the first input power line to the bridge controller 108. Electrical power is returned from the power bridge on the second input power line 116 to the alternator. As illustrated in FIG. 1, a current probe 118 for measuring $I_A(t)$ flowing between the power bridge and the alternator is located adjacent to the second input power line. The current probe supplies the value of $I_A(t)$ on a current probe line 120 to the bridge controller.

The power bridge 106 supplies electrical power on a first output power line 122 to the load 104. The electrical power supplied by the power bridge has an instantaneous voltage $V_{PN}(t)$ and an instantaneous current $I_{PN}(t)$ at time t, which is returned from the load on a second output power line 124 to the power bridge. In preferred embodiments, a filter capacitor 126, which reduces variations in the electrical power output from the power bridge to the load, is coupled between the first and second output power lines.

The power bridge 106 includes four semiconductor switches Q1–Q4. The four semiconductor switches may be bipolar junction transistors (not shown) or MOSFET devices with their corresponding anti-parallel diodes (not shown). Electrical power generated by the alternator 110 is supplied on the first input power line 112 to both the first and third switches Q1 and Q3, respectively. Electrical power is returned from the second and fourth switches Q2 and Q4, respectively, on the second input power line 116 to the alternator. The first and second switches provide electrical power on the first output line 122 to the load 104. The load returns electrical power on the second output line 124 to the third and fourth switches.

The bridge controller 108 generates four control signals G1, G2, G3, and G4 that are supplied on four switch interface lines 128, 130, 132, and 134 to the four semiconductor switches Q1, Q2, Q3, and Q4, respectively. Each of the semiconductor switches is ON when its respective control signal is high or "1," and correspondingly, each of the semiconductor switch is OFF when its respective control signal is low or "0."

Figure 2:
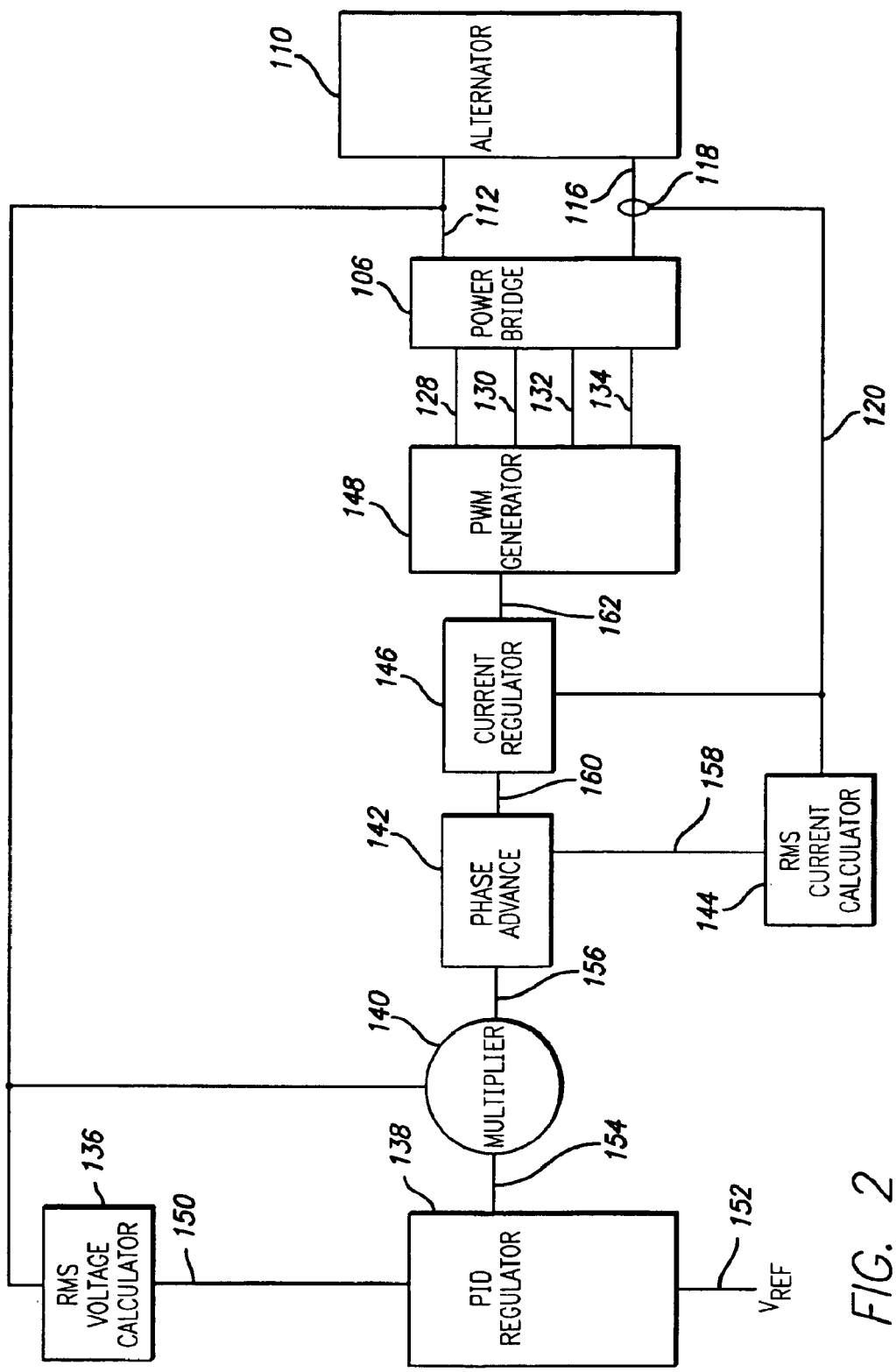
FIG. 2 is a block diagram illustrating a preferred embodiment of the bridge controller of the engine controller depicted in FIG. 1.

FIG. 2 is a block diagram of the alternator 110, power bridge 106, and components that make up the bridge controller 108. As illustrated in FIG. 2, the bridge controller includes an rms voltage calculator 136, a pid regulator 138, a multiplier 140, a phase advance 142, an rms current calculator 144, a current regulator 146, and a pwm generator 148. The alternator provides $V_A(t)$ on the first input power line 112 to the rms voltage calculator and the multiplier. The rms voltage calculator calculates the rms voltage, $V_{rms}$, from measurements of $V_A(t)$ between times $t_0$ and $t_n$, where $t_0-t_n$ equals one half of the time period.

The rms voltage calculator 136 provides $V_{rms}$ on a first pid regulator interface line 150 to the pid regulator 138. The pid regulator also receives a reverence voltage $V_{ref}$, which is set to the voltage desired to be output from alternator 110, on a second pid regulator interface line 152. The pid regulator compares $V_{ref}$ with $V_{rms}$ and supplies a dc reference current $I_{ref1}$, which is proportional in value to the difference between $V_{rms}$ and $V_{ref}$, on a multiplier interface line 154 to the multiplier 140. The multiplier multiplies $I_{ref1}$ by $V_A(t)$, and in doing so converts $I_{ref1}$ into ac reference current $I_{ref2}$, which has the amplitude necessary to maintain the desired emf given the phase of $V_A(t)$. The multiplier supplies $I_{ref2}$ on a first phase advance interface line 156 to the phase advance 142.

The current probe 118 supplies $I_A(t)$ on the current probe line 120 to both the rms current calculator 144 and the current regulator 146. The rms current calculator calculates $I_{rms}$ from measurements of $I_A(t)$ between times $t_0$ and $t_n$. The rms current calculator supplies $I_{rms}$ on a second phase advance interface line 158 to the phase advance 142. The phase advance generates a third reference current $I_{ref3}$, which represents a phase-shifted version of $I_{ref2}$ based on $I_{rms}$, and includes the phase information necessary for proper control of the emf. The phase advance provides $I_{ref3}$ on a current regulator interface line 160 to the current regulator.

The current regulator 146 generates a duty cycle based on the phase difference between $I_A(t)$ and $I_{ref3}$. Thus, the duty cycle output from the current regulator is determined in accordance with the desired voltage, $V_{ref}$, output from the alternator 110, which is directly related to both the desired emf and desired range of motion of the displacement piston (not shown). The greater the phase difference between $I_A(t)$ and $I_{ref}$, the larger the duty cycle. In contrast, the smaller the phase difference between $I_A(t)$ and $I_{ref}$, the smaller the duty cycle. Finally, the current regulator supplies the duty cycle on a pwm generator interface line 162 to the pwm generator 148. The pwm generator generates the four control signals G1, G2, G3, and G4, which control the operation of the semiconductor switches Q1, Q2, Q3, and Q4, respectively, in the power bridge 106.

Figure 3:
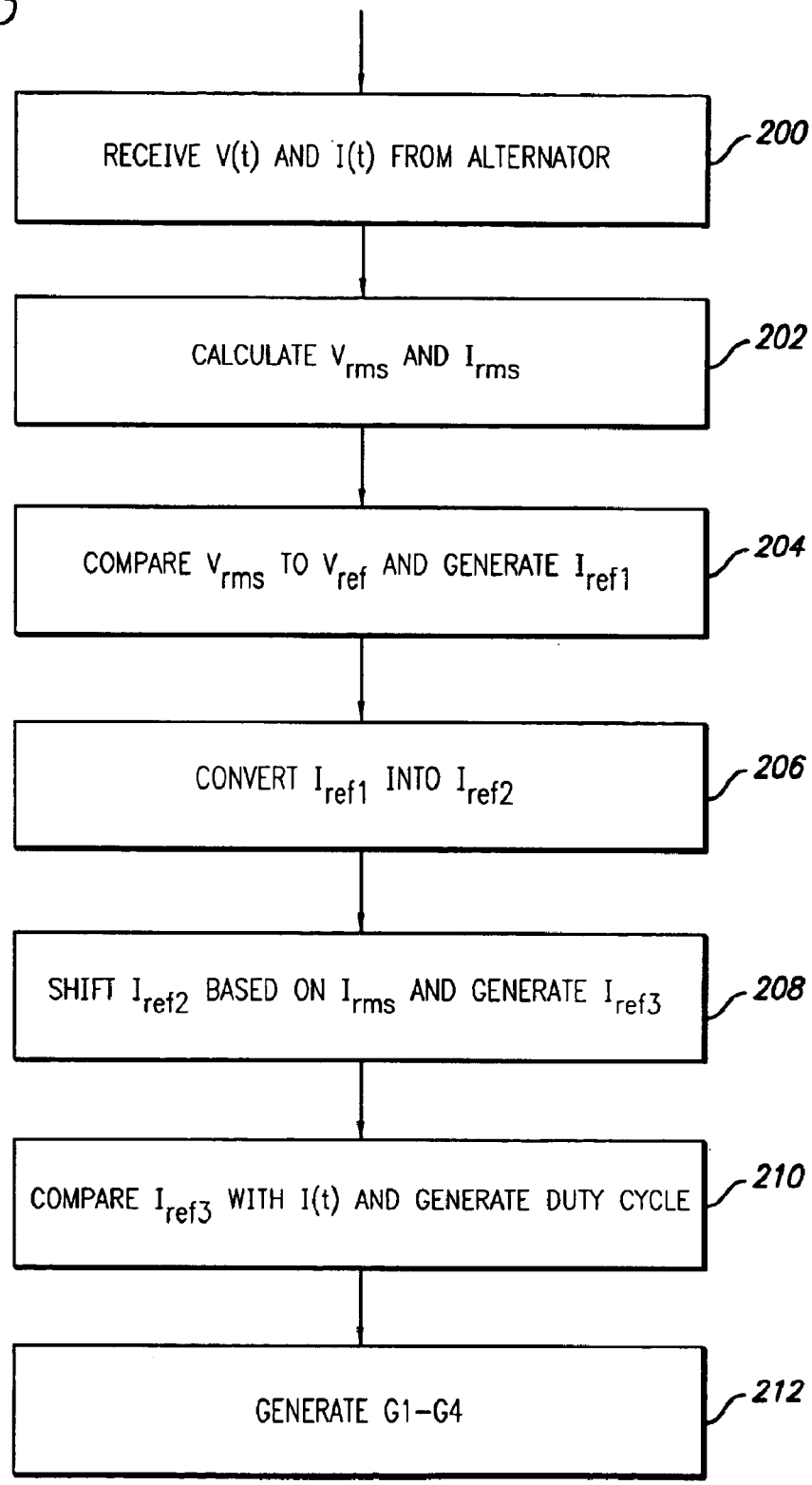
FIG. 3 is a flowchart illustrating the steps performed by the bridge controller depicted in FIG. 2.

FIG. 3 is a flowchart that illustrates the operation of the bridge controller 108. First, the bridge controller receives $V_A(t)$ and $I_A(t)$ measurements from the alternator 110 (Step 200). Next, the rms voltage calculator 136 and rms current calculator 144 calculate $V_{rms}$ and $I_{rms}$ based on the values of $V_A(t)$ and $I_A(t)$, respectively (Step 202). Then, the pid regulator 138 compares $V_{rms}$ with $V_{ref}$, and generates $I_{ref1}$ (Step 204). The multiplier 140 then converts $I_{ref1}$ into $I_{ref2}$ based on $V_A(t)$ (Step 206). Next, the phase advance 142 shifts the phase of $I_{ref2}$ based on $I_{rms}$, and generates $I_{ref3}$ (Step 208). The current regulator 146 then compares $I_A(t)$ and $I_{ref3}$ and generates the duty cycle based on the phase and magnitude difference between $I_A(t)$ and $I_{ref3}$ (Step 210). Finally, using the duty cycle, the pwm generator 148 generates control signals G1–G4 (Step 212).

FIG. 4 illustrates an example of control signals G1–G4, shown in dotted lines, and the resulting $V_A(t)$ output from the alternator 110, shown in solid lines. For simplicity, control signals G1 and G4 are represented by a single pulse, and control signals G2 and G3 are represented by a single pulse. However, it is understood that identical pulses are simultaneously applied to each of the respective switches Q1–Q4.

In a preferred embodiment, switches Q1 and Q4 are ON at the same time and switches Q2 and Q3 are ON at the same time. As depicted in FIG. 4, the amplitude of $V_A(t)$, and thus, the amplitude of $V_{PN}(t)$ and $I_{PN}(t)$, increases as the duty cycle of the control signals G1 and G4, and G2 and G3 increases. In contrast, as the duty cycle of control signals G1 and G4, and G2 and G3 decreases, the amplitude of $V_A(t)$, and thus, the amplitude of $V_{PN}(t)$ and $I_{PN}(t)$, decreases.

Accordingly, by controlling the duty cycle of the control signals G1–G4, the power bridge 106 controls $V_{PN}(t)$ and $I_{PN}(t)$ output from the power bridge as well as $V_A(t)$ and $I_A(t)$ output from the alternator 110. By controlling $V_A(t)$ and $I_A(t)$ output from the alternator, the power bridge also controls the emf of the alternator, the range of motion of the power piston (not shown), and the range of motion of the displacement piston (not shown).

Therefore, the engine controller 100 offers one mode of operation, the constant-amplitude mode, in which the engine controller maintains the range of motion of the power piston (not shown) by maintaining a constant alternator emf. The engine controller can also be used in a second mode of operation, known as a variable-amplitude mode, where the engine controller adjusts the range of motion of the power piston by increasing or decreasing the alternator's emf.

Unlike, prior art linear-motion engines, the linear-motion engine 102 of the present invention is not coupled directly to the load 104, rather, the linear-motion engine is coupled to the load via the power bridge 106. This configuration is advantageous because it eliminates the need to couple a tuning capacitor between the linear-motion engine and the load. With this approach, the tuning capacitor is eliminated resulting in increased reliability and reduced cost.

The foregoing detailed description of the present invention is provided for purposes of illustration, and it is not intended to be exhaustive or to limit the invention to the particular embodiments disclosed. The embodiments may provide different capabilities and benefits, depending on the configuration used to implement the key features of the invention. Accordingly, the scope of the invention is defined only by the following claims.

What is claimed is:

1. An apparatus for controlling a range of movement of a power piston coupled to an alternator in a linear-motion engine, the apparatus comprising:

a power bridge coupled to the alternator that adjusts a voltage output from the alternator; and a bridge controller coupled to the power bridge and the alternator that compares the voltage output from the alternator to a reference voltage corresponding to a desired range of movement of the power piston, and that generates a plurality of control signals used to control the operation of the power bridge.

2. The apparatus according to claim 1, wherein the power bridge comprises a plurality of switches coupled to the bridge controller and each of the plurality of switches receives one of the plurality of control signals.

3. The apparatus according to claim 1, further comprising output power lines coupled between the power bridge and a load, and at least one capacitor is coupled between the output power lines.

4. The apparatus according to claim 1, wherein the bridge controller comprises a root-mean-square voltage calculator coupled to the alternator that calculates a root-mean-square voltage based on the voltage output from the alternator.

5. The apparatus according to claim 4, wherein the bridge controller further comprises a proportional integral derivative regulator coupled to the root-mean-square voltage calculator that receives the root-mean-square voltage and a reference voltage, and that generates a dc reference current as a function of a difference between the root-mean-square voltage and the reference voltage.

6. The apparatus according to claim 5, wherein the bridge controller further comprises a multiplier coupled to the proportional integral derivative regulator and the alternator that converts the dc reference current and the voltage output from the alternator into an ac reference current.

7. The apparatus according to claim 6, wherein the bridge controller further comprises a root-mean-square current calculator that calculates a root-mean-square current based on a current output from the alternator.

8. The apparatus according to claim 7, wherein a current probe is coupled between the root-mean-square current calculator and the alternator.

9. The apparatus according to claim 7, wherein the bridge controller further comprises a phase advance coupled to the multiplier and the root-mean-square current calculator that generates a third reference current that represents a phase-shifted version of the ac reference current.

10. The apparatus according to claim 9, wherein the bridge controller further comprises a current regulator coupled to the phase advance and the alternator that determines a duty cycle based on a difference between the third reference current and the current output from the alternator.

11. The apparatus according to claim 10, wherein the bridge controller further comprises a pulse width modulator generator coupled between the current regulator and the power bridge that generates the plurality of control signals used to control operation of the power bridge based on the duty cycle.

12. The apparatus according to claim 11, wherein the power bridge comprises a plurality of switches coupled to the pulse width modulator generator and each of the plurality of switches receives one of the plurality of control signals.

13. An apparatus for controlling a range of movement of a power piston coupled to an alternator in a linear-motion engine, the apparatus comprising:
a bridge controller coupled to the alternator that compares a voltage output from the alternator to a reference voltage that corresponds to a desired range of movement of the power piston, wherein the bridge controller includes:
a root-mean-square voltage calculator coupled to the alternator that calculates a root-mean-square voltage based on the voltage output from the alternator,
a proportional integral derivative regulator coupled to the root-mean-square voltage calculator that receives the root-mean-square voltage and a reference voltage, and that generates a dc reference current as a function of a difference between the root-mean-square voltage and the reference voltage,
a multiplier coupled to the proportional integral derivative regulator and the alternator that converts the dc reference current and the voltage output from the alternator into an ac reference current,
a root-mean-square current calculator that calculates a root-mean-square current based on a current output from the alternator,
a phase advance coupled to the multiplier and the root-mean-square current calculator that generates a third reference current that represents a phase-shifted version of the ac reference current,
a current regulator coupled to the phase advance and the alternator that determines a duty cycle based on a difference between the third reference current and the current output from the alternator, and
a pulse width modulator generator coupled to the current regulator that generates a plurality of control signals based on the duty cycle; and
a power bridge coupled to the bridge controller and the alternator that adjusts the voltage output from the alternator, wherein the power bridge includes a plurality of switches coupled to the pulse width modulator generator and each of the plurality of switches receives one of the plurality of control signals.

14. An apparatus comprising:
a linear-motion engine including:
a power piston, and
an alternator coupled to the power piston;
a power bridge coupled to the alternator that adjusts a voltage output from the alternator; and
a bridge controller coupled to the power bridge and the alternator that compares the voltage output from the alternator to a reference voltage corresponding to a desired range of movement of the power piston, and that generates a plurality of control signals used to control the operation of the power bridge.

15. The apparatus according to claim 14, wherein the power bridge comprises a plurality of switches coupled to the bridge controller and each of the plurality of switches receives one of the plurality of control signals.

16. The apparatus according to claim 14, further comprising output power lines coupled between the power bridge and a load, and at least one capacitor is coupled between the output power lines.

17. The apparatus according to claim 14, wherein the bridge controller comprises a root-mean-square voltage calculator coupled to the alternator that calculates a root-mean-square voltage based on the voltage output from the alternator.

18. The apparatus according to claim 17, wherein the bridge controller further comprises a proportional integral derivative regulator coupled to the root-mean-square voltage calculator that receives the root-mean-square voltage and a reference voltage, and that generates a dc reference current as a function of a difference between the root-mean-square voltage and the reference voltage.

19. The apparatus according to claim 18, wherein the bridge controller further comprises a multiplier coupled to the proportional integral derivative regulator and the alternator that converts the dc reference current and the voltage output from the alternator into an ac reference current.

20. The apparatus according to claim 19, wherein the bridge controller further comprises a root-mean-square current calculator that calculates a root-mean-square current based on a current output from the alternator.

21. The apparatus according to claim 20, wherein a current probe is coupled between the root-mean-square current calculator and the alternator.

22. The apparatus according to claim 20, wherein the bridge controller further comprises a phase advance coupled to the multiplier and the root-mean-square current calculator that generates a third reference current that represents a phase-shifted version of the ac reference current.

23. The apparatus according to claim 22, wherein the bridge controller further comprises a current regulator coupled to the phase advance and the alternator that determines a duty cycle based on a difference between the third reference current and the current output from the alternator.

24. The apparatus according to claim 23, wherein the bridge controller further comprises a pulse width modulator generator coupled between the current regulator and the power bridge that generates the plurality of control signals used to control operation of the power bridge based on the duty cycle.

25. The apparatus according to claim 24, wherein the power bridge comprises a plurality of switches coupled to the pulse width modulator generator and each of the plurality of switches receives one of the plurality of control signals.

26. An apparatus comprising:
a linear-motion engine including:
a power piston, and
an alternator coupled to the power piston;
a bridge controller coupled to the alternator that compares a voltage output from the alternator to a reference voltage that corresponds to a desired range of movement of the power piston, wherein the bridge controller includes:
a root-mean-square voltage calculator coupled to the alternator that calculates a root-mean-square voltage based on the voltage output from the alternator,
a proportional integral derivative regulator coupled to the root-mean-square voltage calculator that receives the root-mean-square voltage and a reference voltage, and that generates a dc reference current as a function of a difference between the root-mean-square voltage and the reference voltage,
a multiplier coupled to the proportional integral derivative regulator and the alternator that converts the dc reference current and the voltage output from the alternator into an ac reference current,
a root-mean-square current calculator that calculates a root-mean-square current based on a current output from the alternator,
a phase advance coupled to the multiplier and the root-mean-square current calculator that generates a third reference current that represents a phase-shifted version of the ac reference current,
a current regulator coupled to the phase advance and the alternator that determines a duty cycle based on a difference between the third reference current and the current output from the alternator, and
a pulse width modulator generator coupled to the current regulator that generates a plurality of control signals based on the duty cycle; and
a power bridge coupled to the bridge controller and the alternator that adjusts the voltage output from the alternator, wherein the power bridge includes a plurality of switches coupled to the pulse width modulator generator and each of the plurality of switches receives one of the plurality of control signals.

27. A method for controlling a range of movement of a power piston coupled to an alternator in a linear-motion engine, the method comprising:
measuring a voltage output from the alternator;
controlling the range of motion of the power piston by controlling the voltage output from the alternator;
measuring a current output from the alternator;
generating a plurality of control signals based on the voltage output from the alternator and the current output from the alternator; and
controlling the voltage output from the alternator based on the plurality of control signals.

28. A method for controlling a range of movement of a power piston coupled to an alternator in a linear-motion engine, the method comprising:
measuring a voltage output from the alternator;
controlling the range of motion of the power piston by controlling the voltage output from the alternator; and
calculating a root-mean-square voltage from the voltage output from the alternator.

29. The method according to claim 28, further comprising generating a dc reference current based on the root-mean-square voltage and a reference voltage.

30. The method according to claim 29, further comprising measuring a current output from the alternator.

31. The method according to claim 30, further comprising calculating a root-mean-square current from the current output from the alternator.

32. The method according to claim 31, further comprising generating an ac reference current based on the dc reference current and the root-mean-square current.

33. The method according to claim 32, further comprising generating a third reference current based on the ac reference current and the root-mean-square current.

34. The method according to claim 33, further comprising generating a duty cycle based on the third reference current and the current output from the alternator.

35. The method according to claim 34, further comprising:
generating a plurality of control signals based on the duty cycle; and
controlling the voltage output from the alternator based on the plurality of control signals.

36. A method for controlling a range of movement of a power piston coupled to an alternator in a linear-motion engine, the method comprising:
measuring a voltage output from the alternator;
calculating a root-mean-square voltage from the voltage output from the alternator;
generating a dc reference current based on the root-mean-square voltage and a reference voltage;
measuring a current output from the alternator;
calculating a root-mean-square current from the current output from the alternator;
generating an ac reference current-based on the dc reference current and the root-mean-square current;
generating a third reference current based on the ac reference current and the root-mean-square current;
generating a duty cycle based on the third reference current and the current output from the alternator;
generating a plurality of control signals based on the duty cycle; and
controlling the voltage output from the alternator based on the plurality of control signals.

* * * * *